(12) United States Patent
Sakai

(10) Patent No.: US 12,068,106 B2
(45) Date of Patent: Aug. 20, 2024

(54) SOLENOID VALVE

(71) Applicant: DENSO CORPORATION, Kariya (JP)

(72) Inventor: Akira Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 107 days.

(21) Appl. No.: 17/752,130

(22) Filed: May 24, 2022

(65) Prior Publication Data

US 2022/0285065 A1 Sep. 8, 2022

Related U.S. Application Data

(63) Continuation of application No. PCT/JP2020/042970, filed on Nov. 18, 2020.

(30) Foreign Application Priority Data

Nov. 28, 2019 (JP) .................................. 2019-215231

(51) Int. Cl.
*H01F 7/08* (2006.01)
*F16K 31/06* (2006.01)
*H01F 7/16* (2006.01)

(52) U.S. Cl.
CPC ......... *H01F 7/081* (2013.01); *F16K 31/0675* (2013.01); *H01F 7/16* (2013.01); *F16K 31/0613* (2013.01); *H01F 2007/086* (2013.01)

(58) Field of Classification Search
CPC ............... F16K 31/061; F16K 31/0613; F16K 31/0668; F16K 31/0675
USPC ..................................................... 251/129.5
See application file for complete search history.

(56) References Cited

U.S. PATENT DOCUMENTS

| | | | | |
|---|---|---|---|---|
| 2004/0113112 A1* | 6/2004 | Hirata | ................ | F16K 31/0668 251/129.15 |
| 2006/0243938 A1 | 11/2006 | Ishibashi et al. | | |
| 2012/0199771 A1* | 8/2012 | Kasagi | ............... | F16K 31/0686 251/129.15 |
| 2014/0318649 A1* | 10/2014 | So | ....................... | F16K 31/0606 137/599.14 |
| 2019/0264644 A1* | 8/2019 | LaCorre | .................. | F16K 31/06 |
| 2020/0408320 A1* | 12/2020 | Chen | ........................ | F16K 1/36 |
| 2021/0048017 A1* | 2/2021 | Kurihara | ................ | F16K 31/06 |

FOREIGN PATENT DOCUMENTS

WO WO-2019017251 A1 * 1/2019 ............. F16K 31/06

* cited by examiner

*Primary Examiner* — Robert K Arundale
(74) *Attorney, Agent, or Firm* — Nixon & Vanderhye P.C.

(57) ABSTRACT

In a solenoid valve, a length in an axial direction from a stator core end surface to a bottom portion of a yoke is equal to or longer than a total length in the axial direction of a shaft and a plunger. When the shaft and the plunger move to the bottom portion side, the stator core end surface and the spool end surface come into contact with each other so as to restrict a movement of a spool. A groove portion, which communicates a space formed by the stator core, the spool, and the shaft with an accommodating portion when the stator core end surface and the spool end surface come into contact with each other, is formed on at least one of the stator core end surface and the spool end surface, and a communication hole communicates an inside and an outside of the accommodating portion.

6 Claims, 6 Drawing Sheets

SOLENOID VALVE

CROSS REFERENCE TO RELATED APPLICATIONS

This application is a continuation application of International Patent Application No. PCT/JP2020/042970 filed on Nov. 18, 2020, which designated the U.S. and based on and claims the benefits of priority of Japanese Patent Application No. 2019-215231 filed on Nov. 28, 2019. The entire disclosure of all of the above applications is incorporated herein by reference.

TECHNICAL FIELD

The present disclosure relates to a solenoid valve.

BACKGROUND

Conventionally, in a solenoid valve, a solenoid portion and a valve portion are provided.

SUMMARY

A technique for improving a robustness of a supply/discharge capacity of a solenoid valve is required.

The present disclosure can be realized as the following embodiments.

According to one embodiment of the present disclosure, a solenoid valve including a valve portion and a solenoid portion is provided.

The valve portion extends along an axial direction and has a tubular sleeve having a port that opens in a direction intersecting the axial direction, and a spool that is inserted into the sleeve, slides in the axial direction, and adjusts an opening area of the port according to a position of the spool in the axial direction.

The solenoid portion includes
a tubular coil portion that generates magnetic force when energized,
a magnetic yoke having a side surface portion along an axial direction and a bottom portion formed along a direction intersecting the axial direction, and accommodating the coil portion,
a columnar plunger that slides in the axial direction,
a stator core having
 a magnetic attraction core arranged in the axial direction to face a distal end surface of the plunger and configured to attract magnetically the plunger by a magnetic force generated by the coil,
 a sliding core having a cylindrical core portion that is disposed inside the coil in a radial direction perpendicular to the axial direction and accommodates the plunger, and a first magnetic flux transfer portion that is formed from a core end, which is an end of the core portion in the axial direction and faces the bottom portion, toward an outside in the radial direction, and is configured to transfer the magnetic flux between the yoke and the core portion, and
 a magnetic flux passage suppressing portion configured to suppress passage of magnetic flux between the sliding core and the magnetic attraction core, and
a shaft that is provided between the plunger and the spool in the axial direction, inside the magnetic attraction core in the radial direction so as to transmit a thrust of the solenoid portion to the spool.

A length in an axial direction from a stator core end surface to a bottom portion of a yoke is equal to or longer than a total length in the axial direction of the shaft and the plunger. When the shaft and the plunger move to the bottom portion side, the stator core end faces and the spool end surface come into contact with each other so as to restrict a movement of a spool on the solenoid portion side.

A groove portion, which communicates a space formed by the stator core, the spool, and the shaft with an accommodating portion in which an end portion of the spool on the solenoid portion side when the stator core end surface and the spool end surface come into contact with each other, is formed on at least one of the stator core end surface and the spool end surface.

The accommodating portion is formed with a communication hole that communicates an inside and an outside of the accommodating portion.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
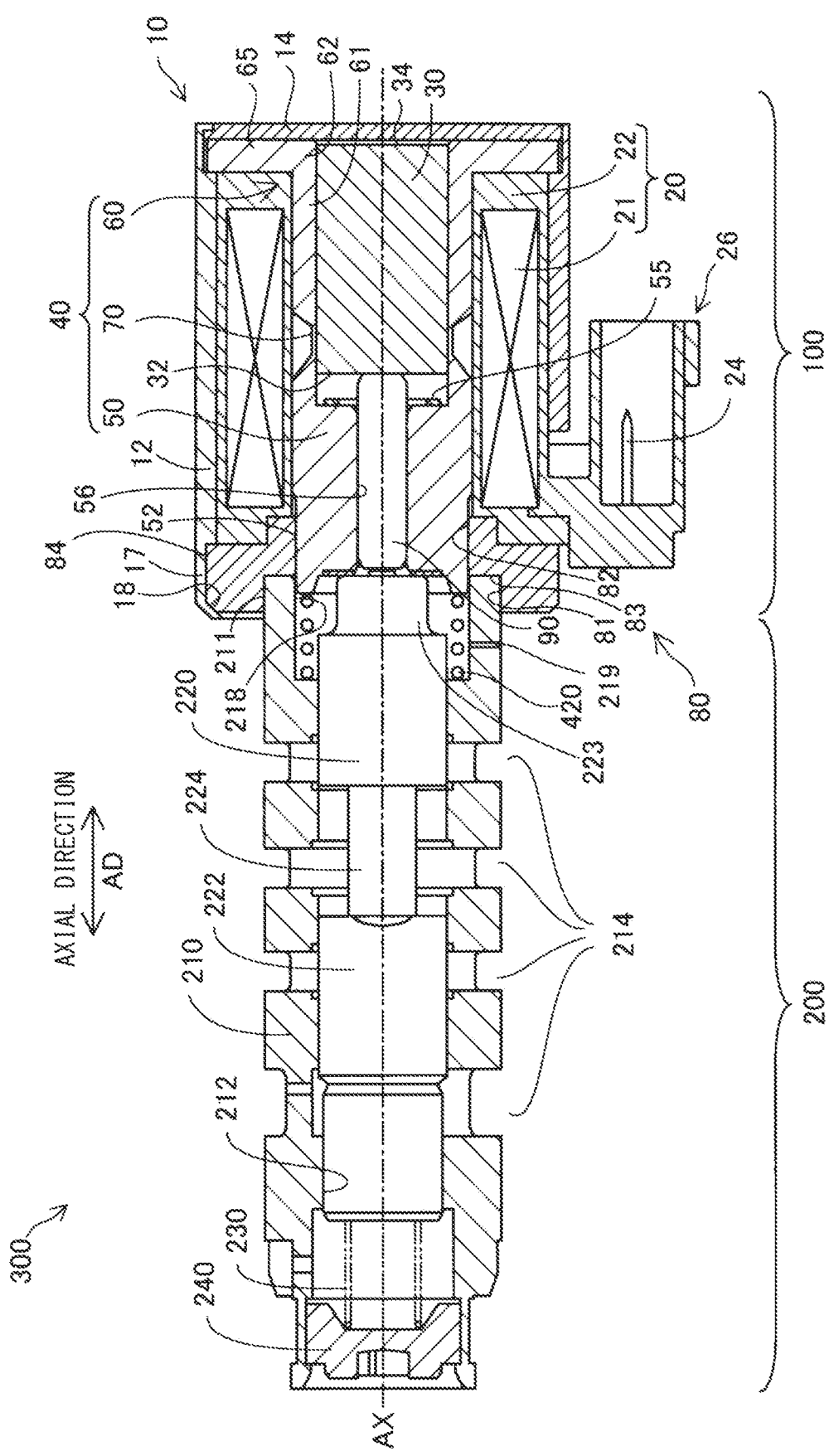
FIG. 1 is a cross-sectional view showing a schematic configuration of a solenoid valve according to a first embodiment.

In an assumable example, a solenoid valve includes a solenoid portion and a valve portion. In the solenoid portion, inside a coil that generates magnetic force by energization, a shaft and a plunger that abuts on the shaft slide in an axial direction inside a stator core. The valve portion has a sleeve into which a spool is inserted and has a port for supplying and discharging fluid. In the solenoid valve, an opening area of the port is adjusted according to a position of the spool in the axial direction, and a supply amount and a discharge amount of the fluid are adjusted.

When the shaft and the plunger in contact with the spool move to a side opposite to the valve portion and the movement of the spool to the solenoid portion side is restricted, the shaft protrudes from an end on the valve portion side of the stator core. Therefore, in the configuration described above, when the movement of the spool to the solenoid side is restricted, a supply/discharge capacity related to the supply/discharge amount of the fluid differs depending on the dimensions within the tolerance of each part of the shaft, the plunger, and the spool. Therefore, a technique for improving the robustness of the supply/discharge capacity of the solenoid valve is required.

The present disclosure can be realized as the following embodiments.

According to one embodiment of the present disclosure, a solenoid valve including a valve portion and a solenoid portion is provided.

The valve portion extends along an axial direction and has a tubular sleeve having a port that opens in a direction intersecting the axial direction, and a spool that is inserted into the sleeve, slides in the axial direction, and adjusts an opening area of the port according to a position of the spool in the axial direction.

The solenoid portion includes
   a tubular coil portion that generates magnetic force when energized,
   a magnetic yoke having a side surface portion along an axial direction and a bottom portion formed along a direction intersecting the axial direction, and accommodating the coil portion,
   a columnar plunger that slides in the axial direction,
   a stator core having
      a magnetic attraction core arranged in the axial direction to face a distal end surface of the plunger and configured to attract magnetically the plunger by a magnetic force generated by the coil,
      a sliding core having a cylindrical core portion that is disposed inside the coil in a radial direction perpendicular to the axial direction and accommodates the plunger, and a first magnetic flux transfer portion that is formed from a core end, which is an end of the core portion in the axial direction and faces the bottom portion, toward an outside in the radial direction, and is configured to transfer the magnetic flux between the yoke and the core portion, and
      a magnetic flux passage suppressing portion configured to suppress passage of magnetic flux between the sliding core and the magnetic attraction core, and
   a shaft that is provided between the plunger and the spool in the axial direction, inside the magnetic attraction core in the radial direction so as to transmit a thrust of the solenoid portion to the spool.

A length in an axial direction from a stator core end surface to a bottom portion of a yoke is equal to or longer than a total length in the axial direction of the shaft and the plunger. When the shaft and the plunger move to the bottom portion side, the stator core end faces and the spool end surface come into contact with each other so as to restrict a movement of a spool on the solenoid portion side.

A groove portion, which communicates a space formed by the stator core, the spool, and the shaft with an accommodating portion in which an end portion of the spool on the solenoid portion side when the stator core end surface and the spool end surface come into contact with each other, is formed on at least one of the stator core end surface and the spool end surface.

The accommodating portion is formed with a communication hole that communicates an inside and an outside of the accommodating portion.

According to the solenoid valve of this configuration, the length in the axial direction from the end surface of the stator core to the bottom portion of the yoke is equal to or larger than the total length or more in the axial direction of the shaft and the plunger. When the shaft and the plunger moves to the bottom portion side of the yoke, the stator core end surface and the spool end surface come into contact with each other, so that the movement of the spool to the solenoid portion side is restricted. Therefore, the fluid supply/discharge capacity of the solenoid valve is affected by the dimensions of the two parts, the stator core and the spool. Therefore, in the solenoid valve of this embodiment, it is possible to improve a robustness of the fluid supply/discharge capacity of the solenoid valve in comparison with an embodiment in which the length in the axial direction from the end surface of the stator core to the bottom portion of the yoke is shorter than the total length in the axial direction of the shaft and the plunger, and the supply/discharge capacity of the solenoid valve when the movement of the spool to the solenoid portion side is restricted is affected by the three parts of the shaft, the plunger, and the spool.

The present disclosure can be realized as the following embodiments. For example, the present disclosure can be realized in the embodiment of a method of manufacturing a solenoid valve, and the like.

A. First Embodiment

A solenoid valve 300 of a first embodiment shown in FIG. 1 is a linear solenoid valve, which is used to control the hydraulic pressure of hydraulic oil supplied to an automatic transmission for vehicles (not shown), and is mounted on a valve body provided on an outer surface of a transmission case (not shown). FIG. 1 schematically shows a cross section of the solenoid valve 300 taken along a central axis AX. The solenoid valve 300 includes a solenoid portion 100 and a valve portion 200 arranged side by side along a central axis AX. In addition, in FIG. 1 and the following figures, the solenoid valve 300 in the non-energized state is shown. An axial direction AD shown in FIG. 1 is a direction parallel to the central axis AX. The solenoid valve 300 of the present embodiment is a normally closed type, but may be a normally open type.

The valve portion 200 shown in FIG. 1 includes a cylindrical sleeve 210, a spool 220, a spring 230, and a spring load adjusting member 240. The valve portion 200 is also referred to as a spool valve.

The sleeve 210 has a substantially cylindrical external shape. The sleeve 210 is formed with an insertion hole 212 penetrating along the central axis AX and a plurality of ports 214 communicating with the insertion hole 212 and opening in a direction intersecting the axial direction AD to allow fluid to flow. In the present embodiment, the ports 214 are open in a radial direction, which is a direction orthogonal to the axial direction AD. The spool 220 is inserted into the insertion hole 212. An end of the insertion hole 212 on the solenoid portion 100 side is formed to have an enlarged diameter and functions as an accommodating portion 218. An end portion 223 of the spool 220 is located in the accommodating portion 218 when the movement of the spool 220 to the solenoid portion 100 side is restricted, and an elastic member 420 described later is accommodated. The accommodating portion 218 is formed with a communication hole 219 that communicates an inside and an outside of the accommodating portion 218. The plurality of ports 214 are formed side by side along the axial direction AD. The plurality of ports 214 function as, for example, an input port, an output port, a feedback port, a drain port, and the like. The input port communicates with an oil pump (not shown) to receive a hydraulic pressure. The output port communicates with a clutch piston (not shown) to supply a hydraulic pressure. The feedback port applies a load to the spool 220 based on the output hydraulic pressure. The drain port discharges the hydraulic oil. An outer peripheral surface 211 of the end portion on the solenoid portion 100 side in the axial direction AD of the sleeve 210 is fastened to an inside of a base portion 80 described later.

The spool 220 has a plurality of large-diameter portions 222 and small-diameter portion 224 arranged side by side along the axial direction AD, and has a substantially rod-like external shape. The spool 220 slides along the axial direction AD inside the insertion hole 212, and adjusts the opening area of the plurality of ports 214 according to a position along the axial direction AD between the large-diameter portion 222 and the small-diameter portion 224. A shaft 90 for transmitting a thrust of the solenoid portion 100 to the spool 220 is arranged at the end portion 223 of the spool 220 on the solenoid portion 100 side. The spring 230 is arranged at the other end of the spool 220. The spring 230 is configured by a compression coil spring, and presses the spool 220 in the axial direction AD to urge the spool 220 toward the solenoid portion 100. The spring load adjusting member 240 is arranged in contact with the spring 230, and adjusts the spring load of the spring 230 by adjusting an amount of screwing into the sleeve 210.

Figure 2:
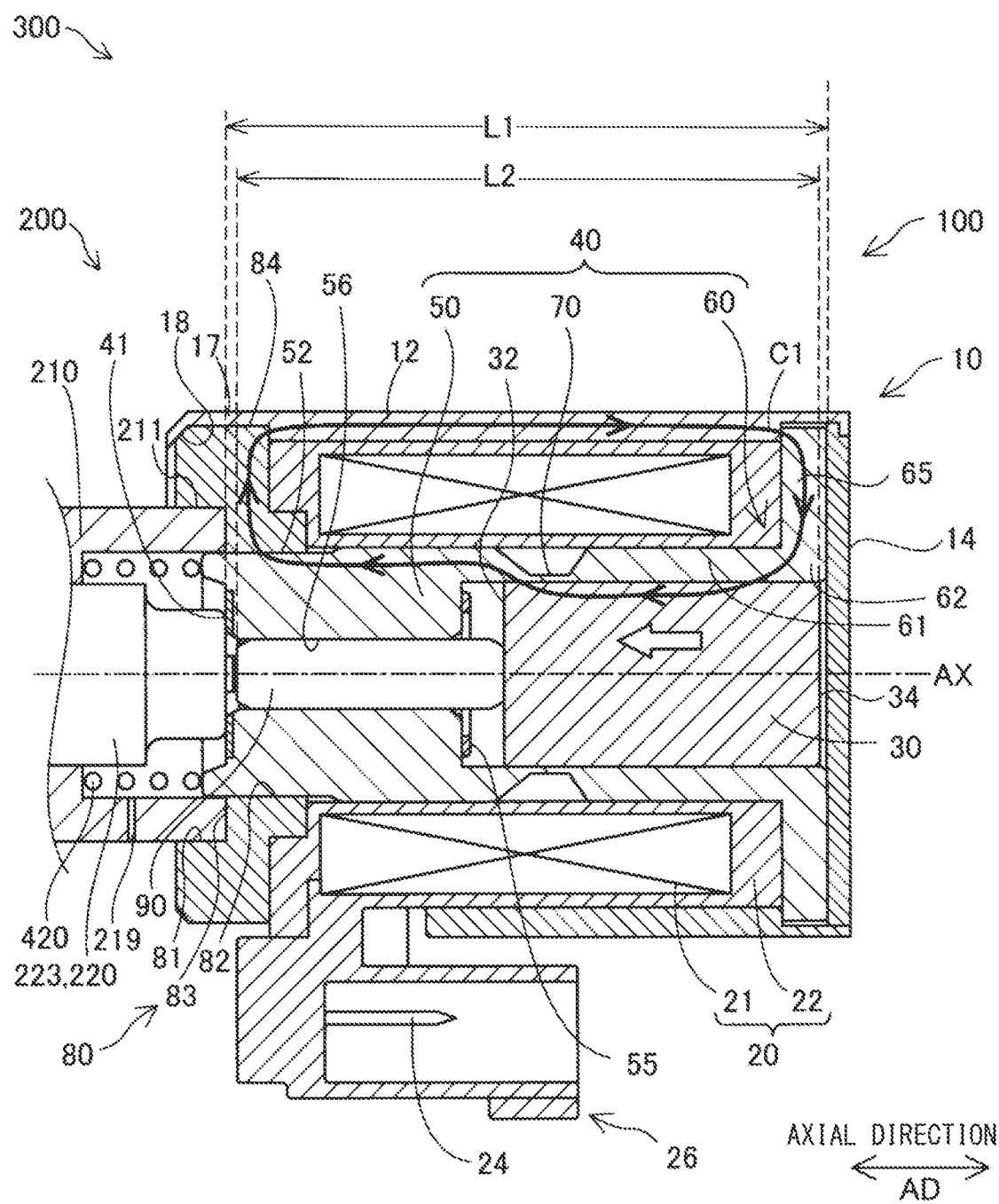
FIG. 2 is a diagram for explaining a magnetic flow in a solenoid valve.

The solenoid portion 100 shown in FIGS. 1 and 2 is energized and controlled by an electronic control device (not shown) to drive the valve portion 200. The solenoid portion 100 includes a yoke 10, a coil portion 20, a plunger 30, the shaft 90, a stator core 40, and the base portion 80.

The yoke 10 is made of a magnetic metal, and forms an outer shell of the solenoid portion 100. The yoke 10 has a bottomed cylindrical external shape, and accommodates the coil portion 20, the plunger 30, and the stator core 40. The yoke 10 has a side surface portion 12, a bottom portion 14, a thin wall portion 17, and an opening portion 18.

The side surface portion 12 has a substantially cylindrical external shape along the axial direction AD, and is disposed radially outside the coil portion 20. The thin wall portion 17 is connected to an end of the side surface portion 12 on the valve portion 200 side and is a portion having a thickness smaller than that of the side surface portion 12. The thin wall portion 17 constitutes the opening portion 18 of the yoke 10. The thin wall portion 17 is in contact with the base portion 80 and is caulked and fixed to the base portion 80.

The bottom portion 14 is formed at the end of the side surface portion 12 and perpendicular to the axial direction AD at the end of the side surface portion 12 opposite to the end opposite to the valve portion 200, and closes the end of the side surface portion 12. The bottom portion 14 is not limited to being perpendicular to the axial direction AD, and may be formed substantially perpendicularly, or may be formed to intersect with the axial direction AD according to the shape of a magnetic flux transfer portion 65 described later. The bottom portion 14 faces a base end surface 34 of the plunger 30 described later.

The coil portion 20 has a tubular shape and is arranged inside the side surface portion 12 of the yoke 10 in the radial direction. The coil portion 20 has a coil 21 and a bobbin 22. The coil 21 is formed of a conducting wire having an insulating coating. The bobbin 22 is made of resin, and the coil 21 is wound around the bobbin 22. The bobbin 22 is connected to a connector 26 arranged on the outer periphery of the yoke 10. A connection terminal 24 to which the end of the coil 21 is connected is arranged inside the connector 26. The connector 26 electrically connects the solenoid portion 100 to the electronic control device via a connection line (not shown). The coil portion 20 generates a magnetic force when energized, and generates a loop-shaped magnetic flux passing through the side surface portion 12 of the yoke 10, the bottom portion 14 of the yoke 10, the stator core 40, the plunger 30, and the base portion 80. (the loop-shaped magnetic flux is hereinafter, referred to as "magnetic circuit Cl"). In the state shown in FIGS. 1 and 2, the energization of the coil portion 20 is not performed and a magnetic circuit is not formed. For convenience of explanation, a part of the magnetic circuit Cl formed when the energization of the coil portion 20 is performed is schematically indicated by a thick arrow in FIG. 2.

The plunger 30 has a substantially cylindrical external shape and is made of a magnetic metal. The plunger 30 slides in the axial direction AD on an inner peripheral surface of a core portion 61 of the stator core 40 described later. An end surface of the shaft 90 described later is in contact with the end surface of the plunger 30 on the valve portion 200 side (hereinafter, also referred to as "distal end surface 32"). As shown in FIG. 2, an end surface of the plunger 30 opposite to the distal end surface 32 (hereinafter, also referred to as a "base end surface 34") faces the bottom portion 14 of the yoke 10. The plunger 30 is formed with a breathing hole (not shown) that penetrates in the axial direction AD. The breathing hole allows fluids such as hydraulic oil and air, which are located on the base end surface 34 side and the distal end surface 32 side of the plunger 30, to flow.

The stator core 40 is made of a magnetic metal, and is disposed between the coil portion 20 and the plunger 30. The stator core 40 is configured by a member in which a magnetic attraction core 50, a sliding core 60, and a magnetic flux passage suppressing portion 70 are integrated.

The magnetic attraction core 50 is formed with a hole 56 in which the shaft slides, and is arranged so as to surround the shaft 90 in the circumferential direction. The magnetic attraction core 50 constitutes a portion of the stator core 40 on the valve portion 200 side, and magnetically attracts the plunger 30 by the magnetic force generated by the coil portion 20. A stopper 55 is disposed on a surface of the magnetic attraction core 50 facing the distal end surface 32 of the plunger 30. The stopper 55 is made of a non-magnetic material, and suppresses a direct contact between the plunger 30 and the magnetic attraction core 50, and also prevents the plunger 30 from being separated from the magnetic attraction core 50 due to the magnetic attraction. In the present embodiment, the base portion 80 is fitted to an outer peripheral surface 52 of the end on the valve portion 200 side in the axial AD of the magnetic attraction core 50.

The sliding core 60 constitutes a portion of the stator core 40 on the bottom portion 14 side, and is disposed radially outside the plunger 30. The sliding core 60 has the core portion 61 and the magnetic flux transfer portion 65.

The core portion 61 has a substantially cylindrical external shape, and is arranged between the coil portion 20 and the plunger 30 in the radial direction. The core portion 61 guides the movement of the plunger 30 along the axial direction AD. As a result, the plunger 30 slides directly on an inner peripheral surface of the core portion 61. There is a sliding gap (not shown) between the core portion 61 and the plunger 30 for ensuring the slidability of the plunger 30. An end portion of the sliding core 60 that is located on an opposite side to the magnetic attraction core 50 side (hereinafter, also referred to as a "core end 62") is in contact with the bottom portion 14.

The magnetic flux transfer portion 65 is formed radially outward from the core end 62 over the entire circumference of the core end 62. Therefore, the magnetic flux transfer portion 65 is arranged between the bobbin 22 and the bottom portion 14 of the yoke 10 in the axial direction AD. The magnetic flux transfer portion 65 transfers magnetic flux between the yoke 10 and the plunger 30 via the core portion 61. The magnetic flux transfer portion 65 of the present embodiment transfers magnetic flux between the bottom portion 14 of the yoke 10 and the plunger 30. The magnetic flux transfer portion 65 may transfer magnetic flux between the side surface portion 12 of the yoke 10 and the plunger 30. The magnetic flux transfer portion 65 of the present embodiment is formed integrally with the core portion 61. The magnetic flux transfer portion 65 and the core portion 61 may be integrated after being formed as separate bodies from each other. For example, the core portion 61 may be press-fitted into a through hole of the magnetic flux transfer portion 65 formed in a ring shape, or may be fixed by welding or the like after the core portion 61 is inserted into the through hole.

The magnetic flux passage suppressing portion 70 is formed between the magnetic attraction core 50 and the core portion 61 in the axial direction AD. The magnetic flux passage suppressing portion 70 suppresses the flow of magnetic flux directly between the core portion 61 and the magnetic attraction core 50. The magnetic flux passage suppressing portion 70 of the present embodiment is configured such that a radial thickness of the stator core 40 is formed to be thin, so that the magnetic resistance of the magnetic flux passage suppressing portion 70 is higher than that of the magnetic attraction core 50 and the core portion 61.

The base portion 80 is a substantially cylindrical magnetic material member, fastened to the outer peripheral surface 211 of the sleeve 210, arranged on the outer side in the radial direction of the outer peripheral surface 52 of the magnetic attraction core 50, and comes into contact with the yoke 10 on the inside of the yoke 10. The base portion 80 includes a first inner diameter part 81, a second inner diameter part 82 having an inner diameter smaller than that of the first inner diameter part 81, and a connecting surface 83 that connects the first inner diameter part 81 and the second inner diameter part 82 and is substantially parallel to the radial direction. The connecting surface 83 is in contact with the end surface of the sleeve 210 on the valve portion 200 side in the axial direction AD. In the present embodiment, the base portion 80 is press-fitted and fastened to the outer peripheral surface 211 at the first inner diameter part 81, and is fitted to the outer peripheral surface 52 at the second inner diameter part 82. Further, the base portion 80 is in contact with the side surface portion 12 of the yoke 10 in the axial direction AD on the outer side in the radial direction and on the solenoid portion 100 side in the axial direction AD. The base portion 80 transfers a magnetic flux between the magnetic attraction core 50 of the stator core 40 and the side surface portion 12 of the yoke 10.

The elastic member 420 is accommodated in an accommodating portion 218 formed in the sleeve 210 of the valve portion 200 and urges the stator core 40 toward the bottom portion 14. The elastic member 420 is arranged in contact with an outer peripheral end surface 216 on the valve portion 200 side of the magnetic attraction core 50 (see FIG. 2). In the present embodiment, the elastic member 420 is configured by a compression coil spring having a substantially cylindrical external shape. The spool 220 is inserted radially inside the elastic member 420. Since the stator core 40 is urged in the axial direction AD toward the bottom portion 14 of the yoke 10 by the elastic member 420, the first magnetic flux transfer portion 65 is pressed against the bottom portion 14, and the magnetic flux transfer portion 65 is pressed to the bottom portion 14. Therefore, the loss of the magnetic flux transmitted from the bottom portion 14 of the yoke 10 to the magnetic flux transfer portion 65 is suppressed.

In the present embodiment, the yoke 10, the plunger 30, the stator core 40, and the base portion 80 are each made of iron. They are not limited to iron, they may be composed of any magnetic material such as nickel and cobalt. In the present embodiment, plating is applied on the outer peripheral surface of the plunger 30. By such a plating treatment, the rigidity of the plunger 30 can be increased, and deterioration of slidability can be suppressed. Further, in the present embodiment, the yoke 10 is formed by press molding and the stator core 40 is formed by forging, but each may be formed by any molding method. For example, the yoke 10 may be integrated by caulking fixing, press-fitting fixing, or the like after the side surface portion 12 and the bottom portion 14 are formed separately from each other. Further, in the present embodiment, the main material of the sleeve 210 is aluminum (Al). The main material of the sleeve 210 may be made of any material other than aluminum (Al).

Unlike the states shown in FIGS. 1 and 2, when the coil 21 is energized, a magnetic circuit Cl is formed inside the solenoid portion 100. The plunger 30 is drawn toward the magnetic attraction core 50 by the formation of the magnetic circuit Cl and slides on the inner peripheral surface of the core portion 61 in the axial direction AD. As the current flowing through the coil portion 20 increases, the magnetic flux density of the magnetic circuit Cl increases, and an amount of movement (a stroke amount) of the plunger 30 increases.

When the plunger 30 moves toward the magnetic attraction core 50, the shaft 90 abutting on the distal end surface 32 of the plunger 30 presses the spool 220 shown in FIG. 1 toward the coil 230. As a result, the opening area of the port 214 is adjusted, and a hydraulic pressure proportional to the value of the current flowing through the coil 21 is output.

FIG. 2 shows a length L1 from the stator core end surface 41 to the bottom portion 14 of the yoke 10 in the axial AD, and a total length L2 in the axial AD of the shaft 90 and the plunger 30. The stator core end surface 41 is an end surface of the stator core 40 on the valve portion 200 side. As shown in FIG. 2, in the solenoid valve 300, the total length L2 is shorter than the length L1, and when not energized, the shaft 90 and the plunger 30 are located between the stator core end surface 41 and the bottom portion 14 of the yoke 10. In the solenoid valve 300, when the shaft 90 and the plunger 30 move to the bottom portion 14 side of the yoke 10, the stator core end surface 41 comes in contact with a spool end surface 221 which is the end surface of the spool 220 on the solenoid portion 100 side. Therefore, the movement of the spool 220 to the solenoid portion 100 side is restricted.

Figure 3:
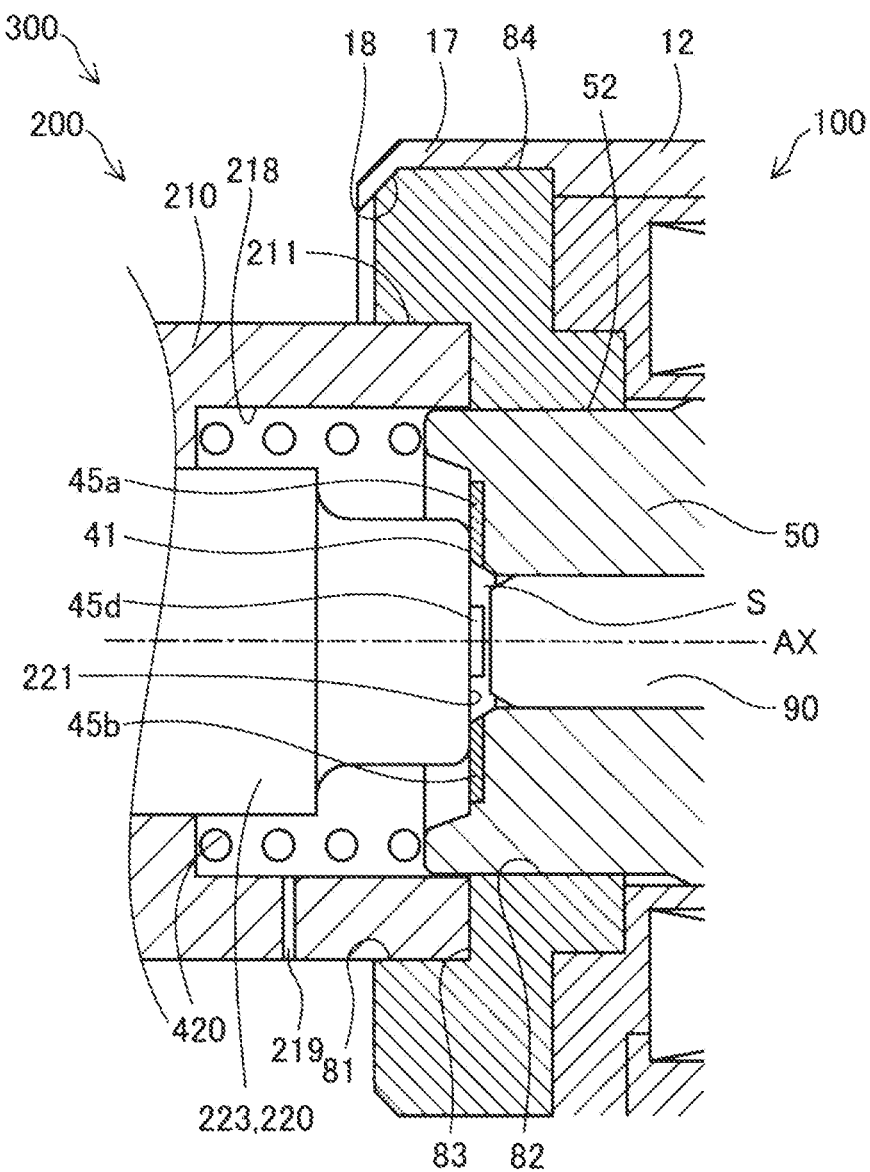
FIG. 3 is a cross-sectional view showing a detailed configuration of a spool end surface and a stator core end surface.
Figure 4:
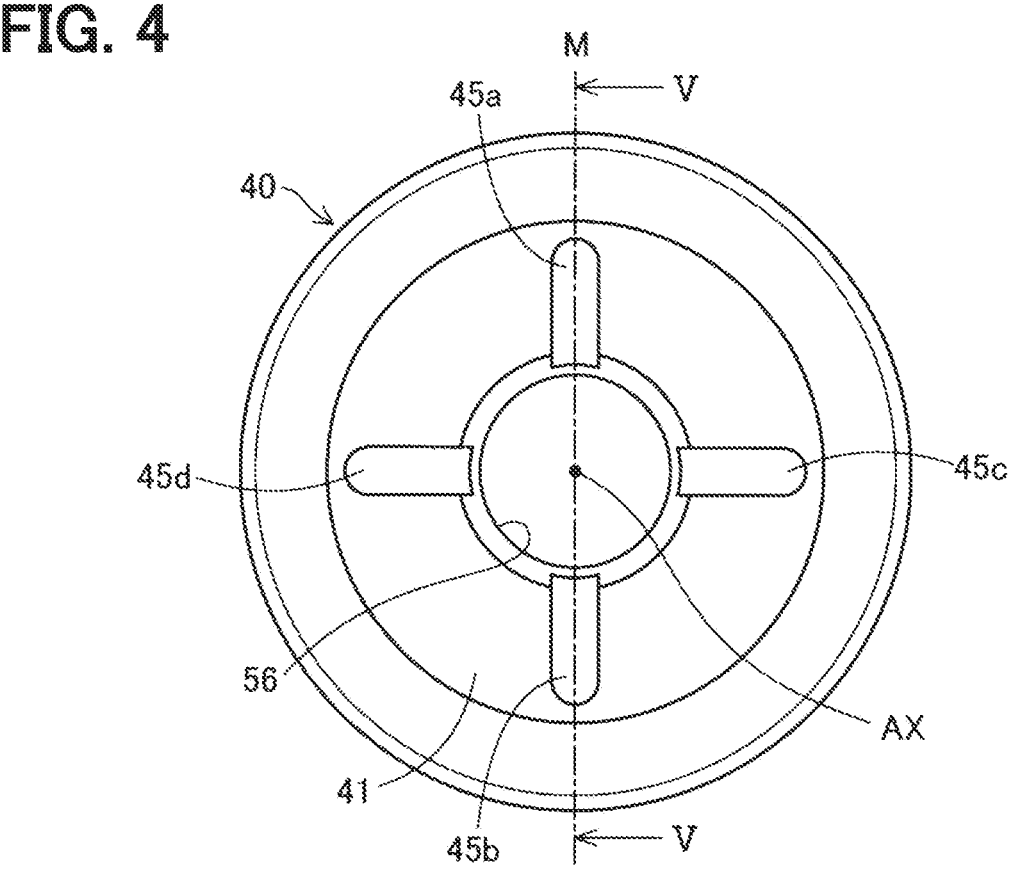
FIG. 4 is a diagram for explaining a groove provided on a stator core end surface.
Figure 5:
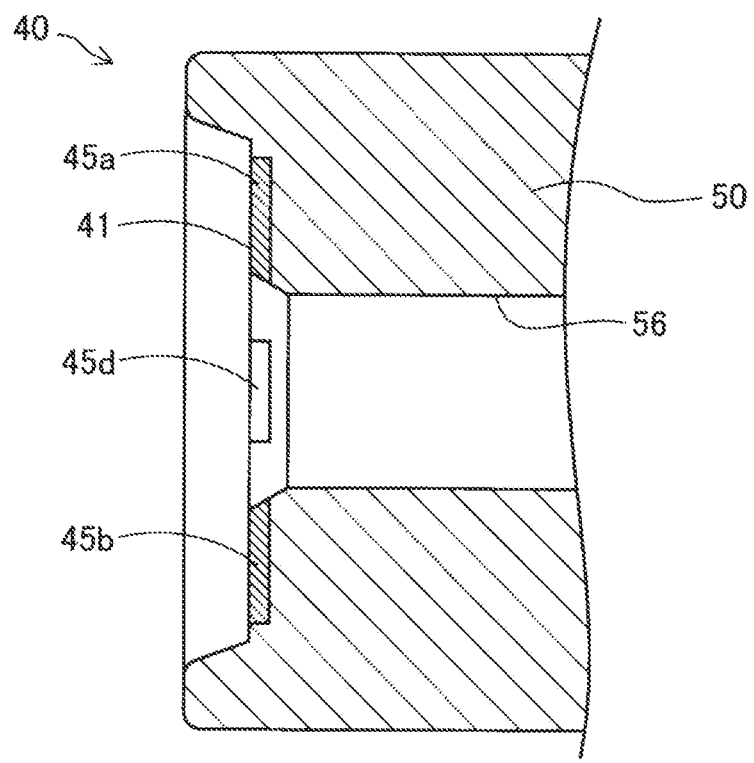
FIG. 5 is a cross-sectional view along a line V-V for explaining a groove provided on a stator core end surface.

FIG. 3 is an enlarged cross-sectional view of a portion of the solenoid valve 300 where the stator core end surface 41 and the spool end surface 221 come into contact with each other. Four groove portions 45a to 45d are formed on the stator core end surface 41. FIG. 4 is a view of the stator core 40 as viewed from the valve portion 200 side, and FIG. 5 is a partial cross-sectional view of the stator core 40. In FIGS. 4 and 5, configurations other than the stator core 40 are not shown. The groove portion 45a to the groove portion 45d extend in the radial direction. The shape of the stator core end surface 41 is symmetrical with respect to a straight line M (see FIG. 4) along the radial direction through the central axis AX. In a mounting environment of the solenoid valve 300, the groove portion 45a is arranged vertically above, the groove portion 45b is arranged vertically below, and the groove portion 45c and the groove portion 45d are arranged in a direction intersecting in the vertical direction. When the stator core end surface 41 and the spool end surface 221 come into contact with each other, the groove portions 45a to 45d communicate a space S (see FIG. 3) formed by the stator core 40, the spool 220, and the shaft 90 with an inside of the accommodating portion 218. Since the accommodating portion 218 is formed with the communication hole 219 that communicates the inside and the outside of the accommodating portion 218 as described above, the space S and the outside of the solenoid valve 300 communicate with each other even when the stator core end surface 41 and the spool end surface 221 are in contact with each other.

For example, in a configuration in which the length L1 in the axial direction AD from the end surface 41 of the stator core to the bottom portion 14 of the yoke 10 is shorter than the total length L2 in the axial direction AD of the shaft 90 and the plunger 30, a fluid supply/discharge capacity of the solenoid valve when the movement of the spool 220 to the solenoid portion 100 side is restricted is affected by the three parts of the shaft 90, the plunger 30, and the spool 220 and may differ depending on the dimensions within the tolerance of the three parts. According to the solenoid valve 300 of this configuration, the length L1 in the axial direction AD from the end surface 41 of the stator core to the bottom portion 14 of the yoke 10 is equal to or larger than the total length L2 or more in the axial direction AD of the shaft 90 and the plunger 30. When the shaft 90 and the plunger 30 moves to the bottom portion 14 side of the yoke 10, the stator core end surface 41 and the spool end surface 221 come into contact with each other, so that the movement of the spool 220 to the solenoid portion 100 side is restricted. Therefore, the fluid supply/discharge capacity of the solenoid valve 300 is affected by the dimensions of the two parts, the stator core 40 and the spool 220. Therefore, in the solenoid valve 300 of this embodiment, it is possible to improve the robustness of the fluid supply/discharge capacity of the solenoid valve 300 in comparison with the configuration in which the length L1 in the axial direction AD from the end surface 41 of the stator core to the bottom portion 14 of the yoke 10 is shorter than the total length L2 in the axial direction AD of the shaft 90 and the plunger 30.

According to this embodiment, when the stator core end surface 41 and the spool end surface 221 come into contact with each other, the groove portions 45a to 45d that communicate the space S formed by the stator core 40, the spool 220, and the shaft 90 with the accommodating portion 218 in which the end portion 223 of the sleeve 210 are accommodated are formed on the stator core end surface 41. The inside of the accommodating portion 218 communicates with the outside through the communication hole 219. Therefore, the space S is not sealed even when the stator core end surface 41 and the spool end surface 221 are in contact with each other. Therefore, when the spool 220 starts moving to the valve portion 200 side, it is possible to prevent the air pressure in the space S from dropping and hindering the movement of the spool 220. Further, even when the spool 220 moves to the valve portion 200 side, the space S is not sealed, so that it is possible to prevent the air in the space S from being compressed and from hindering the movement of the spool 220. Therefore, the movement of the spool 220 in the axial direction AD can be stabilized.

Further, according to this embodiment in the solenoid portion 100, the sliding core 60 has the tubular core portion 61 arranged radially outside the plunger 30 and the magnetic flux transfer portion 65 formed from the core end 62 of the core portion 61 toward the outside in the radial direction to transfer the magnetic flux. Therefore, there is almost no radial gap between the core portion 61 and the magnetic flux transfer portion 65. It is possible to prevent the core portion 61 and the magnetic flux transfer portion 65 from being eccentric. Therefore, due to such eccentricity, it is possible to suppress the occurrence of radial bias in the distribution of the magnetic flux transmitted from the magnetic flux transfer portion 65 to the plunger 30 via the core portion 61. Therefore, it is possible to suppress an increase in side force due to a bias in the distribution of magnetic flux.

B. Second Embodiment

In the solenoid valve 300 of the first embodiment, the groove portions 45a to 45d are formed on the stator core end surface 41. On the other hand, in a solenoid valve 300a of a second embodiment shown in FIG. 6, the groove portions 225a to 225d are formed on a spool end surface 221a which is the end surface of the spool 220a of the valve portion 200a on the solenoid portion 100 side. In this respect, it is different from the first embodiment. In the present embodiment, no groove is formed on the end surface 41a of the stator core 40a.

Figure 6:
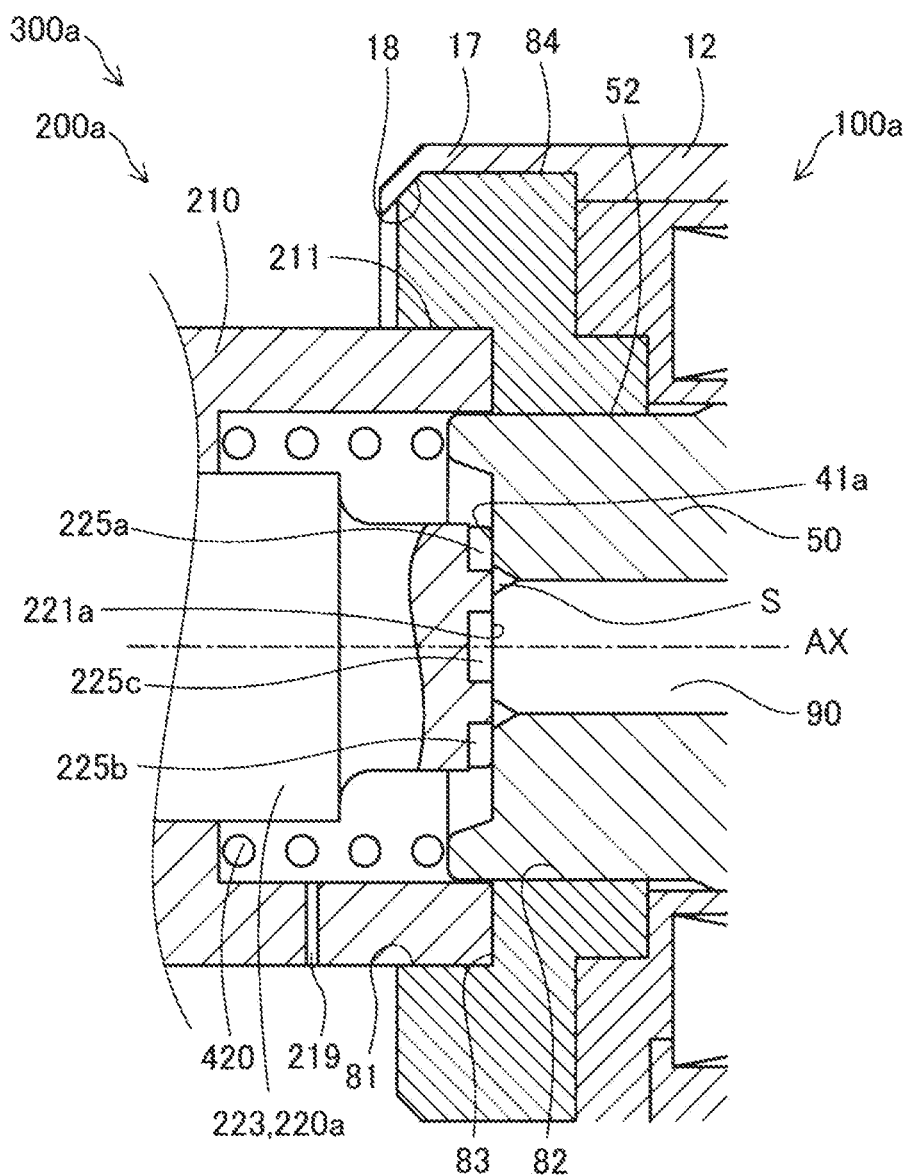
FIG. 6 is a partial cross-sectional view showing a schematic configuration of a solenoid valve according to a second embodiment.
Figure 7:
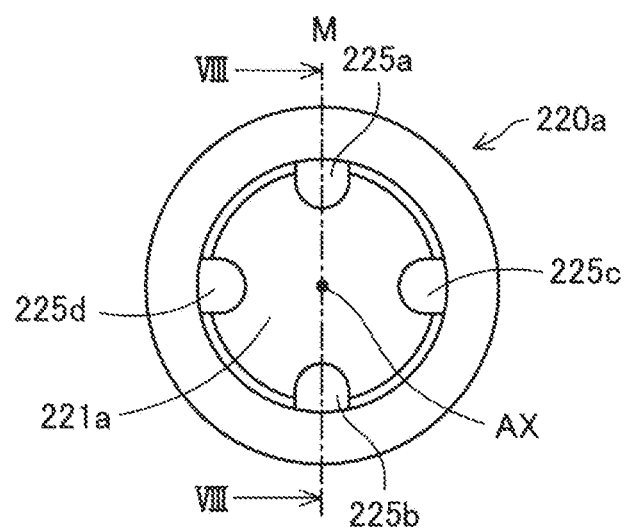
FIG. 7 is a diagram for explaining a groove provided on a spool end surface.
Figure 8:
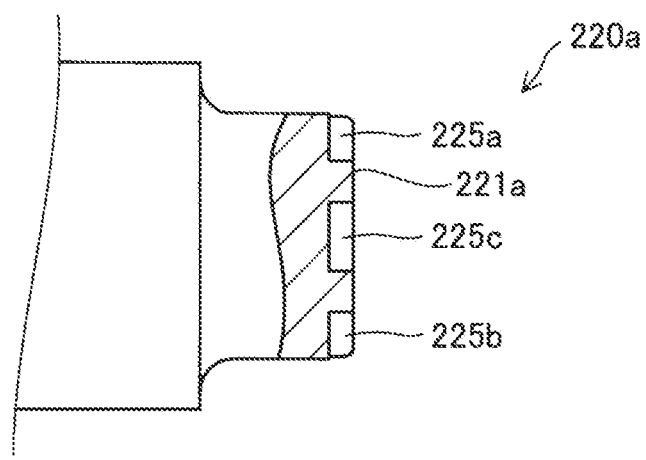
FIG. 8 is a sectional view taken along a line VIII-VIII for explaining a groove provided on a spool end surface.

FIG. 6 corresponds to FIG. 3 of the first embodiment, and is an enlarged cross-sectional view of a portion of the solenoid valve 300a where the stator core end surface 41a and the spool end surface 221a come into contact with each other. FIG. 7 is a view of the spool end surface 221a viewed from the solenoid portion 100a side, and FIG. 8 is a partial cross-sectional view of the spool 220a on the solenoid portion 100a side. Four groove portions 225a to 225d are formed on the spool end surface 221a. In the present embodiment, in the mounting environment of the solenoid valve 300a, the groove portion 225a is arranged vertically above and the groove portion 225b is arranged vertically below. The groove portion 225b is arranged at the position closest to the communication hole 219 in the spool end surface 221a. The groove portion 225c and the groove portion 225d are arranged in a direction in which they intersect in the vertical direction. When the stator core end surface 41a and the spool end surface 221a come into contact with each other, the groove portions 225a to 225d communicate a space S (see FIG. 3) formed by the stator core 40a, the spool 220a, and the shaft 90 with an inside of the accommodating portion 218. The space S and the outside of the solenoid valve 300a communicate with each other even when the stator core end surface 41a and the spool end surface 221a are in contact with each other. Since the other configurations are the same as those of the solenoid valve 300 of the first embodiment, the same configurations are designated by the same reference numerals, and detailed description thereof will be omitted. The solenoid valve 300a of the second embodiment also has the same effect as that of the first embodiment.

C. Other Embodiments (1) The first embodiment and the second embodiment may be combined, and the groove portions 45a to 45d and the groove portions 225a to 225d are formed on both the stator core end surfaces 41 and 41a and the spool end surfaces 221 and 221a. This embodiment also has the same effect as that of the above-described embodiment.

(2) The number of groove portions formed on the stator core end surface 41 in the first embodiment and the number of groove portions formed on the spool end surface 221a in the second embodiment may be one or more, respectively. Further, the position of forming the groove portion on the stator core end surface 41 and the position of forming the groove portion on the spool end surface 221a are not limited to the above embodiment as long as the space S and the accommodating portion 218 can communicate with each other.

(3) The configurations of the solenoid portions 100 and 100a of each of the above embodiments are examples and can be changed in various ways. For example, the core portion 61 of the sliding core 60 and the magnetic flux transfer portion 65 may be formed separately from each other. In such a configuration, the core portion 61 may be press-fitted into the inner hole of the magnetic flux transfer portion 65 formed in an annular shape. Further, for example, the elastic member 420 is not limited to the compression coil spring, and may be composed of any elastic member such as a disc spring or a leaf spring. The elastic member 420 may be arranged between the coil portion 20 and the magnetic flux transfer portion 65 in the axial direction AD instead of the accommodating portion 218 to urge the magnetic flux delivery portion 65. Even with such a configuration, the same effect as that of each of the above described embodiments can be obtained.

(4) In the solenoid valves 300 and 300a of each of the above embodiments, the base portion 80 is omitted, and a flange portion that protrudes in the radial direction is provided at the end of the spools 220 and 220a on the solenoid portions 100 and 100a side, and the flange and the thin portion 17 of the yoke 10 may be fixed.

(5) The solenoid valves 300 and 300a of each of the above embodiments have been applied to a linear solenoid valve for controlling the hydraulic pressure of hydraulic oil supplied to an automatic transmission for a vehicle, but the present disclosure is not limited thereto. For example, the solenoid valve is not limited to being mounted on the valve body provided on the outer surface of the transmission case, but may be mounted on any hydraulic device that requires control of fluid.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

What is claimed is:

1. A solenoid valve, comprising:
a valve portion; and
a solenoid portion, wherein
the valve portion includes
a tubular sleeve extending along an axial direction with a port opening in a direction intersecting the axial direction, and
a spool that is inserted into the sleeve and slides in the axial direction so as to adjust an opening area of the port according to a position of the spool in the axial direction, wherein the spool includes a first portion and an end portion, and the end portion having a smaller diameter than the first portion,
the solenoid portion includes
a tubular coil portion that generates magnetic force when energized,
a magnetic yoke that have a side surface portion along the axial direction and a bottom portion formed along a direction intersecting the axial direction, and that accommodates the coil portion,
a columnar plunger that slides in the axial direction;
a stator core has
a tubular magnetic attraction core arranged in the axial direction to face a distal end surface of the plunger and configured to attract magnetically the plunger by a magnetic force generated by the coil portion,
a sliding core having a tubular core portion arranged inside the coil portion in a radial direction orthogonal to the axial direction and accommodating the plunger, and a magnetic flux transfer portion formed from a core end portion which is an axial end portion of the core portion and faces the bottom portion toward an outside in the radial direction so as to transfer magnetic flux between the yoke and the core portion, and
a magnetic flux passage suppressing portion configured to suppress passage of magnetic flux between the sliding core and the magnetic attraction core; and
a shaft that is provided between the plunger and the spool in the axial direction, inside the magnetic attraction core in the radial direction so as to transmit a thrust of the solenoid portion to the spool,
an axial length from a stator core end surface, which is an end surface of the stator core on the valve portion side, to the bottom portion of the yoke is equal to or longer than a total length of the shaft and the plunger in the axial direction,
when the shaft and the plunger move to the bottom portion side, the stator core end surface and a spool end surface, which is an end surface of the spool on the solenoid portion side come into contact with each other so as to restrict a movement of the spool to the solenoid portion side,
a groove portion, which communicates a space formed by the stator core, the spool, and the shaft with an accommodating portion in which the end portion of the spool on the solenoid portion side is accommodated when the stator core end surface and the spool end surface come into contact with each other, is formed on at least one of the stator core end surface and the spool end surface,
a communication hole is formed in the accommodating portion to communicate an inside and an outside of the accommodating portion,
the end portion of the spool has a larger diameter than a diameter of the shaft, and the spool end surface comes into contact with the stator core end surface,
the end portion of the spool is that portion of the spool that is closest to the shaft,
when the tubular coil portion of the solenoid portion is not energized, there is a gap between a tip of the shaft and the spool end surface, which is the end surface of the spool on the of the solenoid portion side, and
the end portion of the spool, having a smaller diameter than the first portion of the spool, is closer to the tubular coil portion than the first portion and includes the spool end surface.

2. The solenoid valve according to claim 1, wherein the groove portion is formed on the stator core end surface.

3. The solenoid valve according to claim 1, wherein the groove portion is formed on the spool end surface.

4. The solenoid valve according to claim 1, further comprising,
an elastic member accommodated in the accommodating portion.

5. A solenoid valve, comprising:
a valve portion; and
a solenoid portion, wherein
the valve portion includes
a tubular sleeve extending along an axial direction with a port opening in a direction intersecting the axial direction, and
a spool that is inserted into the sleeve and slides in the axial direction so as to adjust an opening area of the port according to a position of the spool in the axial direction,
the solenoid portion includes
a tubular coil portion that generates magnetic force when energized,
a magnetic yoke that have a side surface portion along the axial direction and a bottom portion formed along a direction intersecting the axial direction, and that accommodates the coil portion,
a columnar plunger that slides in the axial direction;
a stator core has
a tubular magnetic attraction core arranged in the axial direction to face a distal end surface of the plunger and configured to attract magnetically the plunger by a magnetic force generated by the coil portion,
a sliding core having a tubular core portion arranged inside the coil portion in a radial direction orthogonal to the axial direction and accommodating the plunger, and a magnetic flux transfer portion formed from a core end portion which is an axial end portion of the core portion and faces the bottom portion toward an outside in the radial direction so as to transfer magnetic flux between the yoke and the core portion, and
a magnetic flux passage suppressing portion configured to suppress passage of magnetic flux between the sliding core and the magnetic attraction core; and
a shaft that is provided between the plunger and the spool in the axial direction, inside the magnetic attraction core in the radial direction so as to transmit a thrust of the solenoid portion to the spool,
an axial length from a stator core end surface, which is an end surface of the stator core on the valve portion side, to the bottom portion of the yoke is equal to or longer than a total length of the shaft and the plunger in the axial direction,
when the shaft and the plunger move to the bottom portion side, the stator core end surface and a spool end surface, which is an end surface of the spool on the solenoid portion side come into contact with each other so as to restrict a movement of the spool to the solenoid portion side,
a groove portion, which communicates a space formed by the stator core, the spool, and the shaft with an accommodating portion in which an end portion of the spool on the solenoid portion side is accommodated when the stator core end surface and the spool end surface come into contact with each other, is formed on at least one of the stator core end surface and the spool end surface,
a communication hole is formed in the accommodating portion to communicate an inside and an outside of the accommodating portion, and
the solenoid valve further comprises an elastic member accommodated in the accommodating portion.

6. A solenoid valve, comprising:
a valve portion; and
a solenoid portion, wherein
the valve portion includes
a tubular sleeve extending along an axial direction with a port opening in a direction intersecting the axial direction, and
a spool that is inserted into the sleeve and slides in the axial direction so as to adjust an opening area of the port according to a position of the spool in the axial direction,
the solenoid portion includes
a tubular coil portion that generates magnetic force when energized,
a magnetic yoke that have a side surface portion along the axial direction and a bottom portion formed along a direction intersecting the axial direction, and that accommodates the coil portion,
a columnar plunger that slides in the axial direction;
a stator core has
a tubular magnetic attraction core arranged in the axial direction to face a distal end surface of the plunger and configured to attract magnetically the plunger by a magnetic force generated by the coil portion,
a sliding core having a tubular core portion arranged inside the coil portion in a radial direction orthogonal to the axial direction and accommodating the plunger, and a magnetic flux transfer portion formed from a core end portion which is an axial end portion of the core portion and faces the bottom portion toward an outside in the radial direction so as to transfer magnetic flux between the yoke and the core portion, and
a magnetic flux passage suppressing portion configured to suppress passage of magnetic flux between the sliding core and the magnetic attraction core; and
a shaft that is provided between the plunger and the spool in the axial direction, inside the magnetic attraction core in the radial direction so as to transmit a thrust of the solenoid portion to the spool,
an axial length from a stator core end surface, which is an end surface of the stator core on the valve portion side, to the bottom portion of the yoke is equal to or longer than a total length of the shaft and the plunger in the axial direction,
when the shaft and the plunger move to the bottom portion side, the stator core end surface and a spool end surface, which is an end surface of the spool on the solenoid portion side come into contact with each other so as to restrict a movement of the spool to the solenoid portion side,
a groove portion, which communicates a space formed by the stator core, the spool, and the shaft with an accommodating portion in which an end portion of the spool on the solenoid portion side is accommodated when the stator core end surface and the spool end surface come into contact with each other, is formed on at least one of the stator core end surface and the spool end surface,
a communication hole is formed in the accommodating portion to communicate an inside and an outside of the accommodating portion,
the end portion of the spool has a larger diameter than a diameter of the shaft, and the spool end surface comes into contact with the stator core end surface,
the end portion of the spool is that portion of the spool that is closest to the shaft; and
the solenoid valve further comprises an elastic member accommodated in the accommodating portion.

* * * * *